United States Patent
Fussell et al.

[11] Patent Number: 5,886,869
[45] Date of Patent: Mar. 23, 1999

[54] ADAPTOR SLEEVE FOR PORTABLE HARD DRIVE

[75] Inventors: Derrill J. Fussell, Scottsdale, Ariz.; Edson E. Ford, Escondido; Charles Truesdell, Vista, both of Calif.

[73] Assignee: Summatec Computer Corporation, Vista, Calif.

[21] Appl. No.: 887,072

[22] Filed: Jul. 2, 1997

Related U.S. Application Data

[63] Continuation-in-part of Ser. No. 788,746, Jan. 27, 1997, Pat. No. 5,737,185.

[51] Int. Cl.[6] .................................. G06F 1/16; H05K 5/03
[52] U.S. Cl. ............................................. 361/685; 360/900
[58] Field of Search ..................................... 361/680, 681, 361/683, 684, 685, 728, 730, 737; 360/97.01, 137, 900; 364/708.1; G06F 1/16

[56] References Cited

U.S. PATENT DOCUMENTS

| | | | |
|---|---|---|---|
| 4,833,554 | 5/1989 | Dalziel et al. | 360/98.04 |
| 4,941,841 | 7/1990 | Darden et al. | 361/685 |
| 5,041,924 | 8/1991 | Blackborow et al. | 360/69 |
| 5,140,478 | 8/1992 | Yoshida | 360/97.01 |
| 5,155,662 | 10/1992 | I-Shou | 361/685 |
| 5,214,567 | 5/1993 | Feightner et al. | 361/685 |
| 5,311,455 | 5/1994 | Ho | 364/708.1 |
| 5,313,596 | 5/1994 | Swindler et al. | 395/725 |
| 5,319,519 | 6/1994 | Sheppard et al. | 361/685 |
| 5,323,291 | 6/1994 | Boyle et al. | 361/683 |
| 5,477,415 | 12/1995 | Mitcham et al. | 361/686 |
| 5,515,237 | 5/1996 | Ogami et al. | 361/685 |
| 5,546,278 | 8/1996 | Bethurum | 361/737 |
| 5,612,927 | 3/1997 | Morrison et al. | 361/685 |
| 5,615,393 | 3/1997 | Kikinis et al. | 361/680 |
| 5,661,636 | 8/1997 | Onoda et al. | 361/685 |
| 5,668,697 | 9/1997 | Dowdy | 361/685 |
| 5,673,172 | 9/1997 | Hastings et al. | 361/685 |
| 5,737,185 | 4/1998 | Morrison et al. | 361/685 |

OTHER PUBLICATIONS

Disctec Removable Hard Drives Brochure "PC Computing Magazine" Oct. or Nov. 1992 Winter Park, FL.
Vison Logic Advertisement San Jose CA 408–437–1000—Date Unknown.

*Primary Examiner*—Lynn D. Feild
*Attorney, Agent, or Firm*—John L. Rogitz

[57] ABSTRACT

A sleeve for holding a hard disk drive in portable removable engagement with a PC or laptop computer includes a base and a cover attachable to the base by means of threaded fasteners. The base includes plural holder arms, and when the cover is removed from the base and the hard disk drive advanced into the base, the holder arms move outwardly as the hard drive rides on the arms. When the hard disk drive clears the arms, the arms, which are biased to a hold configuration, move back inwardly to hold the hard disk drive in the base, with the cover then attached to the base. The edge of the cover cooperates with the base to hold the holder arms in the hold configuration and thereby securely hold the hard disk drive in the sleeve.

17 Claims, 9 Drawing Sheets

ADAPTOR SLEEVE FOR PORTABLE HARD DRIVE

RELATED APPLICATIONS

The present application claims priority from and is a continuation in part of U.S. patent application Ser. No. 08/788,746, filed on Jan. 27, 1997, now U.S. Pat. No. 5,737,185, entitled "LATCH & EJECTION MECHANISM FOR PORTABLE HARD DRIVE", incorporated herein by reference, which in turn claims priority from issued U.S. Pat. Nos. 5,612,927, and 5,319,519, both incorporated herein by reference.

FIELD OF THE INVENTION

The present invention relates generally to computer memory apparatus, and more particularly to computer hard disk drives for personal computers (PCs).

BACKGROUND

Computer data in desk-top personal computers (PCs) is ordinarily stored on one of two generic types of direct access memory media, i.e., memory media which can be accessed when the user is on-line with the PC, and these two types of direct access memory media are broadly know as "disks" and "drives". The first type of direct access memory media is familiarly referred to as a "hard disk drive". A hard disk drive may be internal, i.e., it may be mounted within the PC, or external, i.e., it may be located next to the PC, but in either case, hard disk drives require electrical connections to the PC that can be cumbersome and time-consuming to make.

In contrast, a unit of the second type of direct access memory media, familiarly referred to as a "floppy disk", is manually inserted into a portion of the computer familiarly referred to as a floppy disk drive, and a floppy disk can be easily and quickly ejected from the floppy disk drive after data transfer. Thus, a floppy disk can be ejected, i.e., manually urged outwardly from a PC by pushing a button, without requiring that "hard" electrical contacts be unmade. On the other hand, a hard disk drive currently cannot be ejected from a desk-top PC, but must be disconnected from electrical connections in the PC and then removed. Hard disk drives, however, can store much more data than can floppy disks.

Modern PCs typically permit the use of both kinds of memory media, to afford the user of the PC the advantages associated with each. More specifically, as stated above, hard disk drives, which are ordinarily intended to be permanently connected to their respective PCs, have a large data storage capacity. In contrast, floppy disks have much lower data storage capability as compared to hard disk drives, but can easily be ejected from the computer when it is necessary to store data, e.g., confidential military or economic data, apart from the computer, or to transport the data computer-to-computer when a network is not available.

While this arrangement of data storage is useful, it has certain drawbacks. For example, when sensitive military or economic data is to be transferred from the permanent hard disk drive of a PC to a floppy disk for secure storage of the data, the only thing ordinarily "deleted" from the PC hard disk drive after data transfer is the name of the file that contains the data. The data, however, while inaccessible using most software, remains on the hard disk drive, and can be retrieved using specialized software. Thus, once confidential data has been stored on a permanently mounted hard disk drive, both the hard disk drive and it's associated PC must be treated as classified equipage. Understandably, this increases security costs and limits the access of non-cleared users to the PC.

Further, because of their relatively limited data storage capability, floppy disks cannot be used to store large amounts of data. Thus, if a large amount of data is to be transferred from the hard disk drive of a computer, more than a single floppy disk may be required. This increases expenses, tends to be labor-intensive, and requires excessive storage space.

Consequently, when large amounts of data are to be physically moved from a non-secure location to a comparatively secure area for data analysis, the data is ordinarily stored on a hard disk drive which is subsequently disconnected from the so-called host computer and then transported to the secure area. For example, surveillance aircraft tend to collect a large amount of data, and the collected data is stored in relatively bulky hard disk drives that have large data storage capacities. After mission completion, the disk drives are electrically disconnected from their host computers, which as stated above can be cumbersome and time consuming, and then removed from the craft after the mission for data analysis. Furthermore, many large hard disk drives unfortunately are heavy. This is a disadvantage in most computer applications and particularly in applications requiring airborne computer operation, wherein it is generally crucial to minimize the weight and volume of articles that are to be carried onboard the aircraft.

The above discussion focussed on but one application wherein data portability is desirable, but the need for data portability is acute in a wide variety of other applications requiring data transfer between computers. Indeed, regardless of the particular application, a growing need exists to transfer large amounts of data between pairs of the ubiquitous desk-top personal computer. For example, a person who is located at a site remote from his desk-top PC (and its associated hard disk drive on which the person's files and software are stored) may require access to some or all of the data base (i.e., files and software) that is stored on the hard disk drive. When networks or network software are unavailable, the person must take his data base with him. He can do this by disconnecting his hard disk drive from his PC, transporting his hard disk drive with him, and then reconnecting the disk drive to a computer located at the remote site. Alternatively, the person can up-load his data base to a large number of floppy disks one at a time, transport the floppy disks to the remote site, and then down-load the data base from the floppy disks one at a time onto a computer located at the remote site. Unfortunately, both procedures are cumbersome and time-consuming.

In light of the above discussion, the above-referenced parent and grandparent applications, as well as the present invention, recognize a need to provide the portability advantages inherent in floppy disks, without sacrificing the data storage capacity of hard disk drives.

As further recognized by the present invention, owing to the delicate nature of certain components of hard disk drives, particular considerations arise in connection with a portable hard disk drive system wherein the hard disk drive can be easily advanced into and ejected from a PC. For example, certain internal components of hard disk drives rotate very rapidly, and these components must be allowed to "spin down" prior to ejecting the disk drive from the computer. Otherwise, the disk drive could be irreparably damaged. Furthermore, to increase the operational convenience of the PC, provisions should ideally be made for configuring the portable, ejectable hard disk drive as the main drive (i.e., the so-called "C" drive) of the associated PC.

As still further recognized by the present invention, it would be advantageous to provide the capability of easily engaging a removable hard drive from a personal computer having an internal docking station for receiving the drive with a laptop computer, and with another personal computer that does not have an internal docking station.

Accordingly, it is an object of the present invention to provide an apparatus that can be associated with a desk-top personal computer and which can hold a portable hard computer disk drive in operable engagement with the computer. Another object of the present invention is to provide an apparatus for easily inserting and ejecting a portable hard disk drive into a desk-top personal computer. Yet another object of the present invention is to provide a portable hard disk drive housing for a desk-top personal computer which is easy to use and cost-effective to manufacture. Still another object of the present invention is to provide a system with a portable, ejectable hard disk drive which automatically permits the disk drive to adequately spin down prior to ejection from an associated PC, and which provides for convenient operation of the PC. Another object herein is to provide a system for receiving a hard drive in a docking station that is internal to a personal computer (PC), while permitting easy engagement of the hard drive when removed from the docking station with laptop computers and with other PCs that do not have internal docking stations. Further, it is an object to provide a sleeve for securely holding a hard disk drive.

SUMMARY OF THE INVENTION

An apparatus is disclosed that is operably engageable with a cavity of a desk-top personal computer (PC). The apparatus of the present invention includes a sleeve for holding a hard computer disk drive, and the sleeve is formed with an engagement surface. A bay is positioned in the cavity of the computer for receiving the sleeve.

In accordance with the present invention, the bay includes an opening for receiving the sleeve, and the bay is electrically connected to the personal computer. Moreover, a carriage is reciprocally disposed in the bay, and the carriage includes at least one clip that is configured for engaging the engagement surface of the sleeve when the sleeve is advanced a predetermined distance into the opening. A motor is coupled to the carriage for moving the carriage between an engaged position, wherein the hard drive is electrically connected to the personal computer, and a remove position, wherein the sleeve can be manually removed from the bay.

In one presently preferred embodiment, a key element is connected to the bay and is slidably engageable with the sleeve for guiding the sleeve into the bay. The key element includes left and right elements opposed to each other relative to the bay, and the sleeve is formed with a guide channel for engaging the key element.

Preferably, the sleeve is formed with two engagement surfaces and the carriage includes respective opposed clips and a shuttle. Each clip is pivotally connected to the shuttle and each clip is biased to a disengaged position, wherein the clip is distanced from the associated engagement surface of the sleeve. Further, each clip is pivotable to an engaged position, wherein the clip engages the associated engagement surface of the sleeve.

As envisioned by the present invention, two camming surfaces are formed on the bay. Each camming surface is configured for moving a respective one of the clips to the engaged position when the carriage moves past a predetermined position relative to the bay, to thereby engage the carriage with the sleeve.

In the preferred embodiment, the carriage includes a lead screw that is coupled to the motor for rotation of the lead screw by the motor. Additionally, the carriage includes a nut which is threadably engaged with the lead screw. To prevent relative motion between the nut and the shuttle, the shuttle is formed with a retaining cavity and the nut is positioned in the retaining cavity. Consequently, when the motor rotates the lead screw, the nut travels on the lead screw to cause the shuttle to move translationally within the bay.

Motor control signals are generated by a first limit switch which is mounted on the bay for detecting when the sleeve is in a home position. The first limit switch generates a signal to activate the motor. Also, a second limit switch is mounted on the bay for detecting when the carriage is in the engaged position and for generating a signal in response thereto to deactivate the motor.

Another aspect of the present invention is an apparatus for releasably holding a sleeve that contains a hard disk drive in operable engagement with a computer which is formed with a cavity. The apparatus includes a bay positioned in the cavity in electrical communication with the computer, and a motor-driven carriage disposed in the bay for moving the sleeve with hard disk drive into operable engagement with the computer to permit data transfer between the hard disk drive and the computer.

In still another aspect of the present invention, a computer system includes a computer including a cavity and a bay positioned in the cavity, and the bay is formed with an opening. A sleeve contains a hard disk drive, and the sleeve with hard disk drive is movable between an engaged position, wherein the hard disk drive is in electrical communication with the computer, and a remove position, wherein the sleeve with hard disk drive can be manually removed from the bay. Also, a motor is operably engaged with the bay for moving the sleeve with hard disk drive to the engaged position and for selectively moving the sleeve with hard disk drive from the engaged position toward the remove position. Furthermore, an eject button is mounted on the bay. The eject button is selectively manipulable to cause the motor to move the sleeve from the engaged position toward the remove position.

In another aspect of the present invention, a method is disclosed for transferring data from a desk-top personal computer (PC) to a hard disk drive having a surrounding sleeve. The method includes the steps of providing an opening in the desk-top PC, and advancing the sleeve with hard disk drive into the opening. Then, the sleeve is engaged and automatically transported into the opening until electrical contact is made between the hard disk drive and the PC. Next, data is transferred between the hard disk drive and the PC. After data transfer, the hard disk drive is ejected from the PC.

In an alternate embodiment, an apparatus is operably engageable with a cavity of a desk-top personal computer (PC), and the apparatus includes a sleeve for holding a hard computer disk drive, the sleeve with disk drive including electrical connectors. A shoe is configured for slidably receiving the sleeve, and a shoe connector board is disposed in the shoe for mating with the electrical connectors. An adaptor card is electrically connected to the connector board, it being understood that the adaptor card is configured for engagement with a laptop computer to effect data transfer between the laptop computer and the hard drive.

In a preferred embodiment, a connector and a round cord interconnect the adaptor card and the shoe connector board. Preferably, the shoe includes an open front end, a closed back wall, and opposed sides extending between the front end and back wall. The sleeve is receivable through the front end, with the shoe connector board being mounted on the back wall.

In yet another embodiment, an apparatus is operably engageable with a parallel port of a desk-top personal computer (PC), and the apparatus includes a sleeve for holding a hard computer disk drive, the sleeve being formed with an engagement surface. An external docking station is electrically connectable to the parallel port, with the docking station including an opening for receiving the sleeve. A carriage is reciprocally disposed in the docking station, and the carriage includes at least one clip configured for engaging the engagement surface of the sleeve when the sleeve is advanced a predetermined distance into the opening. A motor is coupled to the carriage for moving the carriage between an engaged position, wherein the hard drive is electrically connected to the personal computer, and a remove position, wherein the sleeve can be manually removed from the docking station.

In another aspect, an apparatus is operably engageable with a cavity of a desk-top personal computer (PC). The apparatus includes a sleeve for holding a hard computer disk drive, the sleeve being formed with an engagement surface. A bay is positioned in the cavity of the computer for receiving the sleeve, the bay including an opening for receiving the sleeve, the bay being in electrical communication with the personal computer. Also, a carriage is reciprocally disposed in the bay, with the carriage including at least one clip configured for engaging the engagement surface of the sleeve when the sleeve is advanced a predetermined distance into the opening. Further, the carriage includes a shuttle formed with at least one nut dock. A motor is coupled to the carriage for moving the carriage between an engaged position, wherein the hard drive is electrically connected to the personal computer, and a remove position, wherein the sleeve can be manually removed from the bay. The motor is coupled to the carriage via a lead screw and a nut, and the lead screw is threadably engaged with the nut and rotatable by the motor. As contemplated herein, the nut is closely received in the at least one nut dock such that rotation of the nut is prevented thereby. An eject button is mounted on the bay, and the eject button is selectively manipulable to cause the motor to move the sleeve from the engaged position toward the remove position after a predetermined time period has elapsed to spin down the hard disk drive.

In another embodiment, a sleeve is provided for securely holding a hard disk drive therein. The sleeve includes a hollow top cover that defines a flat planar top surface and an edge flange bounding at least part of the planar surface and oriented perpendicular thereto. A hollow bottom base is removably connectable to the top cover, with the base defining a flat planar base surface. As disclosed below in detail, the base includes plural holder arms that are perpendicular to the base surface, and the holder arms are biased to a hold configuration, wherein the holder arms overlap the top surface of the hard disk drive when the hard disk drive is positioned in the bottom base to hold the hard disk drive in the bottom base. Moreover, the holder arms are movable to a receive configuration when the hard disk drive is advanced into the bottom base. Once the hard disk drive is in the base and the cover is attached to the base, the edge of the cover prevents the holder arms from moving to the receive configuration.

Preferably, each holder arm is formed with a respective shank perpendicular to the flat planar base surface of the base, and each shank terminates in a respective curved top portion. Per the present invention, each holder arm also includes a respective flat abutment that is contiguous to the curved top portion and to the shank. Each abutment surface is perpendicular to its respective shank. With this structure, the hard disk drive can be advanced into the base while riding on the curved top portions of the holder arms to move the holder arms toward the receive configuration, and the holder arms return to the hold configuration when the hard disk drive clears the curved top portions with the flat abutments flush against the top surface of the hard disk drive.

In one presently preferred embodiment, plural threaded fasteners extend through the top cover and engage receptacles on the hard disk drive. The holder arms are arranged on the base such that when the hard disk drive is positioned in the base, a respective receptacle of the hard disk drive is juxtaposed with a respective holder arm. At least one base receptacle is provided on the base for engaging a respective fastener to thereby hold the cover on the base.

In another aspect of the just-disclosed embodiment, a sleeve is configured for securely holding a computer hard disk drive. The sleeve includes a cover, and a base including at least one holder arm extending upwardly toward the cover. In accordance with present principles, the holder arm cooperates with the cover to hold the hard disk drive securely in the base when the hard disk drive is positioned in the base.

The details of the present invention, both as to its construction and operation, can best be understood in reference to the accompanying drawings, in which like reference numerals refer to like parts, and in which:

DETAILED DESCRIPTION OF THE PREFERRED EMBODIMENT

Figure 1:
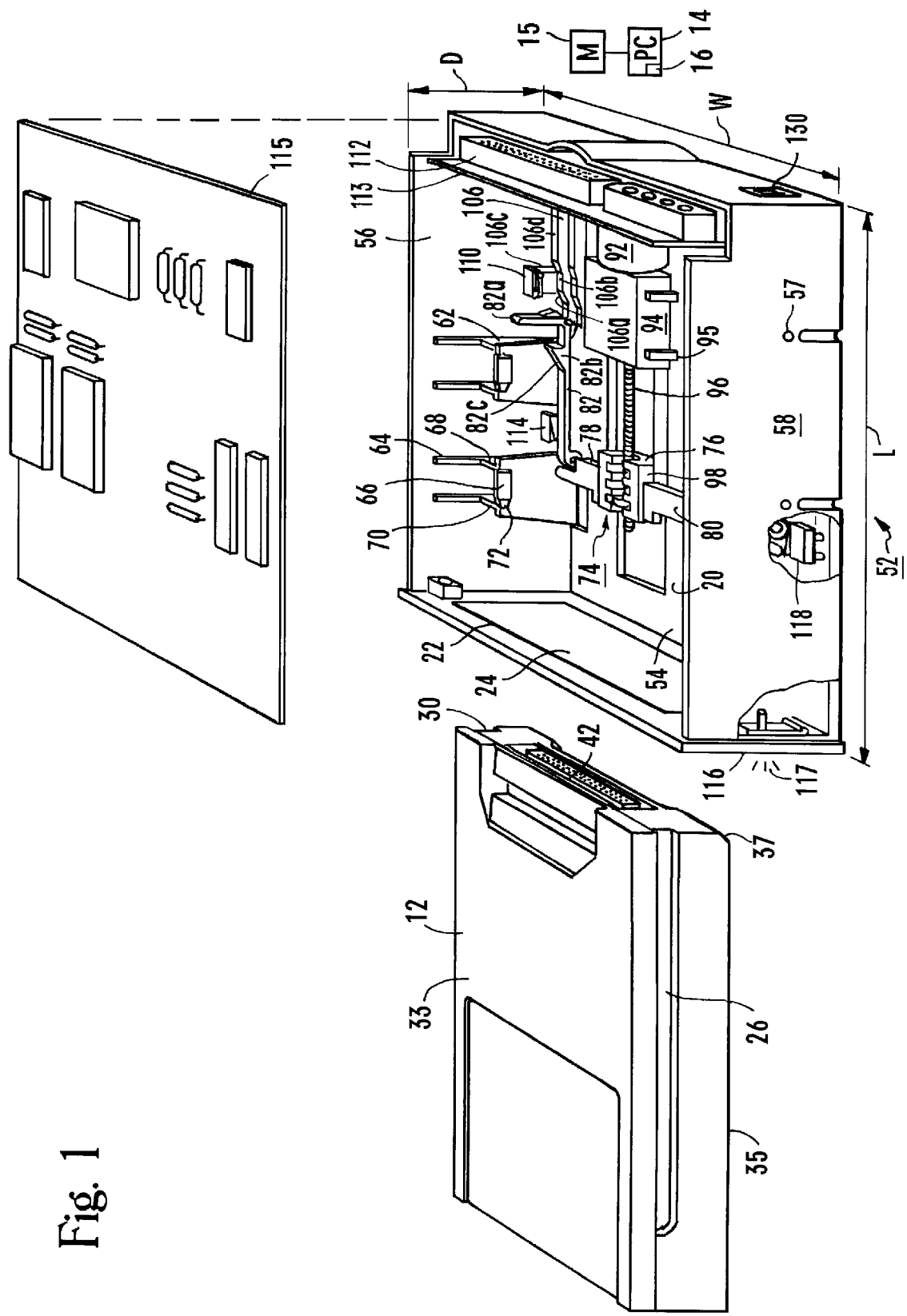
FIG. 1 is an exploded perspective view of the computer bay for portable hard disk drives of the present invention, with portions cut away and with an associated personal computer (PC) shown schematically.

Referring initially to FIG. 1, an apparatus, generally designated 10, is shown for holding a portable hard disk drive sleeve 12 in operable engagement with a lap-top or desk-top personal computer (PC) 14 (not to scale) having an associated video monitor 15. It is to be understood in reference to FIG. 1 that the apparatus 10 fits snugly within a standard-sized disk drive cavity 16 of the PC 14.

In the presently preferred embodiment, the PC 14 is a device familiarly referred to as an International Business Machines (IBM) compatible PC, e.g., an IBM® PS2 model 70 computer. Accordingly, in the preferred embodiment the cavity 16 is the so-called "3.5 inch form factor" cavity (actually four inches in width) formed in most IBM compatible desk-top personal computers. It is to be understood, however, that the principles of the present invention can be applied to other IBM-compatible computers, e.g., lap-top computers, and to non-IBM compatible computers, e.g., Apple® brand computers, having cavities smaller or larger than the cavity 16.

FIG. 1 shows that the apparatus 10 includes a bay 20 having an opening 22. The opening 22 is covered by a movable flap 24, the bottom edge of which is hingedly connected to the bay 20. The flap 24 is normally biased to completely block the opening 22, and the sleeve 12 can be advanced against the flap 24 to cause the flap 24 to pivot inwardly about its bottom edge and thereby permit the sleeve 12 to be advanced into the opening 22.

As can be appreciated in reference to FIG. 1, the portable hard disk drive sleeve 12 with disk drive can be manually advanced into the opening 22 of the bay 20 and held in operable engagement with the personal computer 14. When the sleeve 12 is operably engaged with the bay 20, data can be stored on the hard disk drive by the user of the computer 14. Then, the sleeve 12 with hard disk drive can be ejected from the computer 14 and transported to another location for data retrieval.

Figure 2:
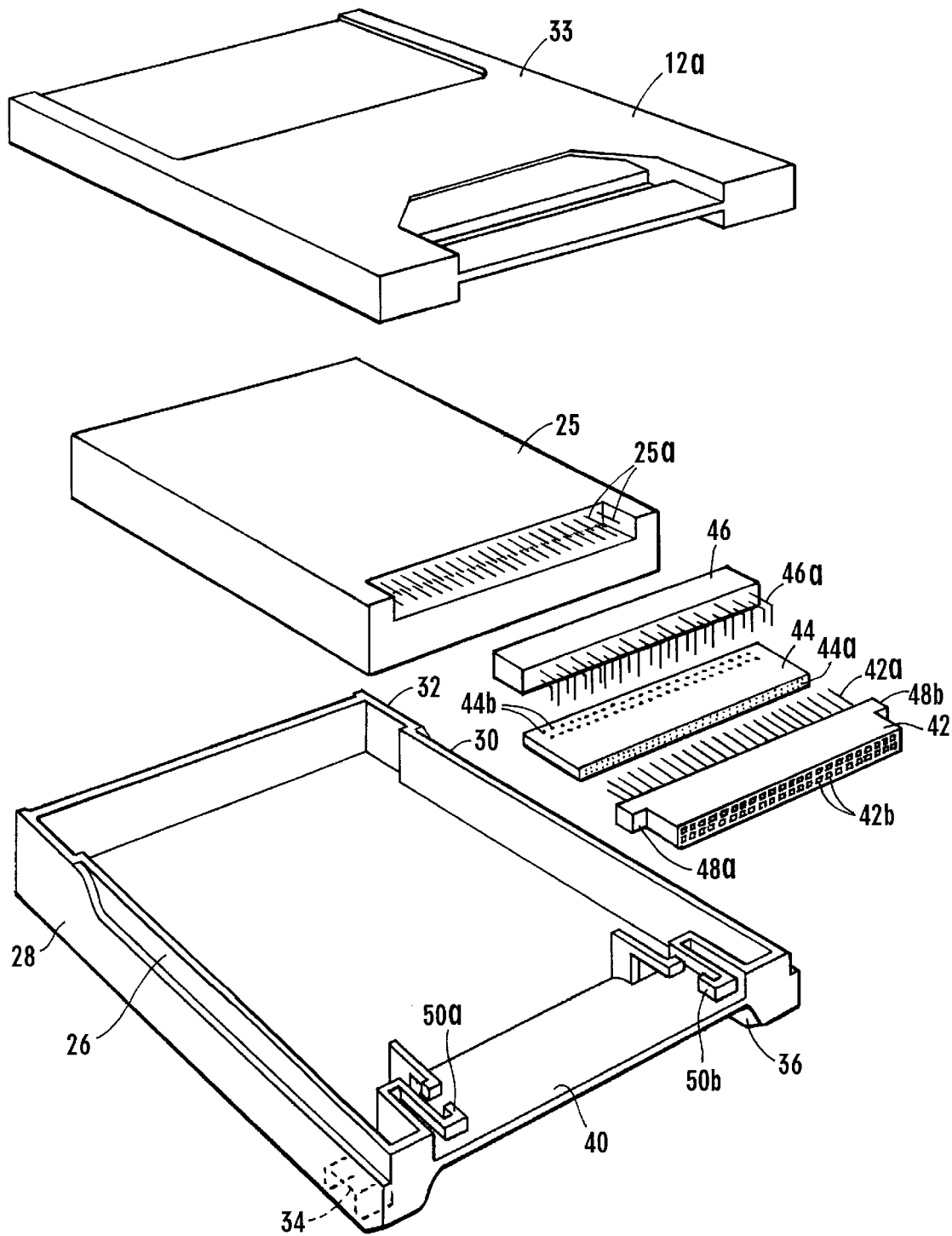
FIG. 2 is an exploded isometric view of the portable hard disk drive and sleeve.

In cross-reference to FIGS. 1 and 2, the sleeve 12 is made of an upper plastic injection-molded half 12a and a lower plastic injection-molded half 12b, and the upper half 12a is bonded, glued, or otherwise attached to the lower half 12b by means well-known in the art to establish a hollow sleeve 12. As can be appreciated in reference to FIG. 2, the sleeve 12 closely surrounds a portable hard disk drive 25 for supporting the disk drive 25. Preferably, the sleeve 12 is made of nylon or other plastic material to protect the disk drive 25 from shock, and to inhibit dust and debris from contacting the disk drive 25. In the presently preferred embodiment, the hard disk drive 25 is a model 2022A hard disk drive made by Digital Electronics Corporation. Alternatively, the disk drive 25 can be drive made by Toshiba Corp., or Hitachi Corp., or some other disk drive manufacturer.

As shown in cross-reference to FIGS. 1 and 2, a right guide channel 26 is longitudinally formed in a right side surface 28 of the lower half 12b of the sleeve 12. FIG. 2 further shows that a left guide channel 30 is longitudinally formed in a left side surface 32 of the lower half 12b of the sleeve 12.

Referring back to FIG. 1, the sleeve 12 defines a top surface 33 and a bottom surface 35, and the guide channels 26, 30 are formed closer to the top surface 33 than to the bottom surface 35. As more fully disclosed below, the guide channels 26, 30 slidably engage structure within the bay 20. With this in mind, it will be appreciated that inverted insertion of the sleeve 12 into the bay 20 is prevented by so forming the guide channels 26, 30 closer to one surface 33 than to the opposite surface 35. The sleeve 12 also has a bottom front edge 37 which is bevelled as shown to facilitate insertion of the sleeve 12 into the bay 20.

Referring again to FIG. 2, right and left generally parallelepiped-shaped latch depressions 34, 36 are also formed in the bottom surface 35 of the lower half 12b of the sleeve 12. As intended by the present invention, the latch depressions 34, 36 establish corresponding engagement surfaces.

As shown in FIG. 2, an electrical sleeve connector, generally designated 38, is positioned on a connector surface 40 of the sleeve 12. More particularly, the sleeve connector 38 includes a flat, generally parallelepiped-shaped bay interface connector 42 having a plurality of pins 42a and a corresponding plurality of sockets 42b.

Also, the sleeve connector 38 includes a flat, parallelepiped-shaped intermediate printed circuit board (pcb) 44 having a plurality of first sockets 44a and a plurality of second sockets 44b. As can be appreciated in reference to FIG. 2, the pins 42a of the bay interface connector 42 engage the first sockets 44a of the interface pcb 44.

Additionally, the sleeve connector 38 includes a flat, parallelepiped-shaped disk drive interface connector 46 having a plurality of L-shaped pins 46a, and the L-shaped pins 46a engage the second sockets 44b of the intermediate disk drive interface pcb 44. Moreover, the disk drive interface connector 46 includes a plurality of sockets (not shown) which engage hard drive connector pins 25a of the hard drive 25.

It will accordingly be appreciated that the memory media of the hard drive 25 is in electrical communication with the sleeve connector 38. Consequently, the sockets 42b of the bay interface connector 42 of the sleeve connector 38 can be electrically engaged with structure within the bay 20, as more fully disclosed below, to establish electrical communication between the memory media of the hard drive 25 and the PC 14.

In the presently preferred embodiment, the sleeve connector 38 is similar to the so-called PCMIA connector well-known in the art, except that the connector 40 includes sixty (60) connections instead of sixty eight (68). As intended by the present invention, to provide for interoperability of the present invention with both SCSI-type and IDE-type hard drives, power can be applied or not applied via various pin connections as appropriate for the particular disk drive 25 type, by conventions well-known in the art. Also, one of the connections of the sleeve connector 38, designated the "identification" connection, is shorted. As the skilled artisan will appreciate, the identification connection can be used to determine whether the hard drive 25 is an IDE- or SCSI-type hard drive. In addition, six lines may be reserved for providing a data path for signals that identify the particular disk drive 25 model.

FIG. 2 also shows that the bay interface connector 42 is formed with two opposed ears 48a, 48b. Also, the lower half 12*b* of the sleeve 12 is formed during molding with clips 50*a*, 50*b* that respectively engage the ears 48*a*, 48*b* of the bay interface connector 42. Also, the clips 50*a*, 50*b* support the bay interface connector 42. In the presently preferred embodiment, the clips 50*a*, 50*b* snappingly engage the ears 48*a*, 48*b* to hold the ears 48*a*, 48*b* against the clips 50*a*, 50*b*.

Now referring to FIGS. 1 and 3A–3C, the details of the bay 20 can be seen. As shown in FIG. 1, the bay 20 includes a hollow, generally parallelepiped-shaped metal or hard plastic molded chassis 52. The chassis 52 has a bottom plate 54, and first and second side surfaces 56, 58 extending upwardly from the bottom plate 54 perpendicular to the bottom plate 54. As shown, each side surface 56, 58 of the chassis 52 has holes 57 drilled or otherwise formed in it, for receiving respective threaded fasteners (not shown). The fasteners in turn are engaged with standard mounting receptacles (not shown) within the computer 14, to hold the chassis 52 within the cavity 16 of the computer 14.

Accordingly, the chassis 52 is configured for fitting snugly within the cavity 16 of the computer 14. Specifically, when the computer 14 is an IBM-compatible desk top PC and the cavity 16 is a so-called "3.5 inch form factor" cavity, the chassis 52 has a length "L" of about six inches (6"), a width "W" of about four inches (4"), and a depth "D" of about one and five-eighths inches (1.625").

Figure 3A:
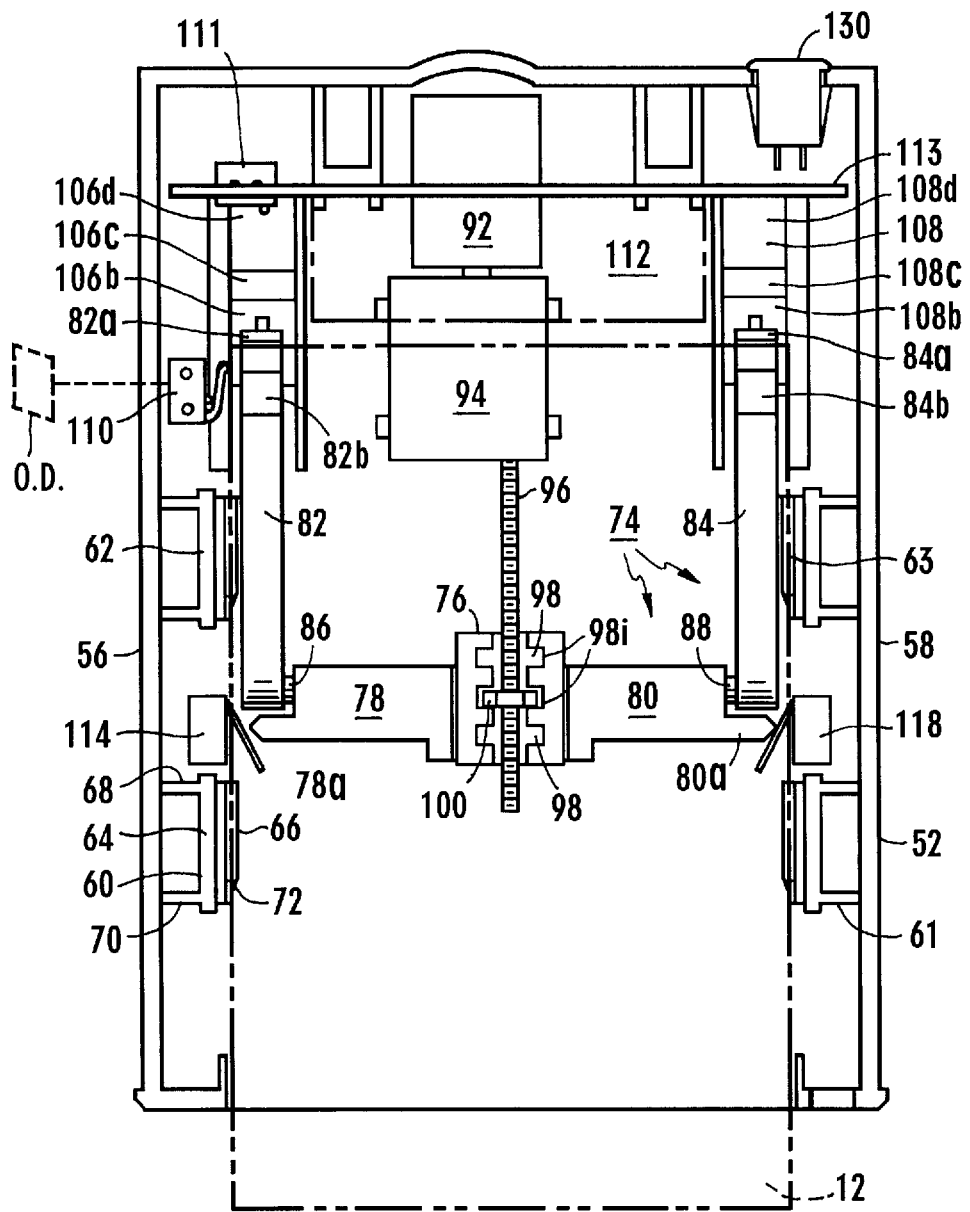
FIG. 3A is a top plan view of the computer bay, showing the disk drive sleeve in phantom in the home position and showing the alternate optical detector in phantom.

FIGS. 1 and 3A also show that each side 56, 58 of the bay 20 is respectively formed with two key elements 60, 62 and 61, 63 for engaging the guide channels 26, 30 of the sleeve 12 and thereby guiding the sleeve 12 with disk drive 25 into operable engagement with the bay 20. As shown, the key elements 60, 61, 62, 63 are substantially identical to each other in configuration, and each key element 60, 61, 62, 63 protrudes inwardly toward the center of the bay 20 from the key element's respective bay side 56, 58.

In describing the key elements 60, 61, 62, 63 the key element 60 is used an example. As shown in FIG. 1, the key element 60 is formed with a base portion 64 and a key surface 66. As further shown, to minimize the material required for the key element 60, the base portion 64 is not a continuous solid piece of material, but rather includes two legs 68, 70, and the legs 68, 70 support the key surface 66.

The key surface 66 includes a guide surface 72 which is oriented at an oblique angle relative to the side 56 to guide the left guide channel 30 (FIG. 2) of the sleeve 12 into engagement with the key element 60. Stated differently, the guide surface 72 establishes a ramp from near the first side 56 of the bay 20 up to the key surface 66, to facilitate engaging the sleeve 12 with the key element 60.

In cross-reference to FIGS. 1 and 3A, a motor-driven carriage, generally designated 74, is disposed in the bay 20 for moving the sleeve 12 with hard disk drive 25 within the bay 20. As shown, the carriage 74 includes a hollow, generally parallelepiped-shaped shuttle 76. The shuttle 76 is connected to or formed integrally with left and right arms 78, 80, and each arn 78, 80 is pivotally connected to a respective elongated left or right clip 82, 84.

More specifically, each arm 78, 80 is formed with a respective end pin 86, 88 (FIG. 3A), and the end pins 86, 88 are rotatably engaged with respective pin receiving holes formed in the clips 82, 84. Consequently, the clips 82, 84 can pivot about their pin receiving holes relative to the arms 78, 80. If desired, limiter abutments 90 (FIG. 3A) can be formed on the clips 82, 84 to thereby limit the range of pivotal motion of the clips 82, 84 by abutting the arms 78, 80 when the clip 82 or 84 exceeds a predetermined angle relative to its arm 78, 80. Still further, each arm 78, 80 is formed with a respective extension 78*a*, 80*a*, with the only difference between the arms 78, 80 being that the extension 78*a* of the left arm 78 is marginally shorter than the extension 80*a* of the right arm 80, for purposes to be disclosed.

In continued cross-reference to FIGS. 1 and 3A, each clip 82, 84 is formed during molding with a respective sleeve stop 82*a*, 84*a* (stop 84*a* shown only in FIG. 3A), and a respective engagement abutment 82*b*, 84*b* (abutment 84*a* shown only in FIG. 3A) having a respective front incline 82*c*, 84*c*. In accordance with the present invention, the engagement abutments 82*b*, 84*b* are configured for engaging the latch depressions 34, 36 (FIG. 2) of the sleeve 12. Further, the skilled artisan will appreciate that the front inclines 82*c*, 84*c* facilitate guiding the sleeve 12 past the inclines 82*c*, 84*c* and toward the engagement abutments 82*a*, 84*a*.

As perhaps best shown in FIG. 3A, the present invention provides structure for reciprocally moving the shuttle 76 (and, hence, clips 82, 84) within the bay 20. Specifically, an electric motor 92, preferably a type FK-130SH-09450 motor made by Mibuchi, is coupled to spur gears (not shown) which are disposed in a gear box 94. The spur gears reduce the rotational speed of the shaft of the motor 92 about twenty times by means well-known in the art. If desired, supports 95 can be attached to the bay 20 and juxtaposed with the gear box 94 to restrain the gear box 94 from motion.

As can be appreciated in reference to FIG. 3A, the spur gears are coupled to a lead screw 96, preferably a lead screw made by Acme having a pitch of one millimeter (1 mm) and an outer diameter of four millimeters (4 mm). As shown, the lead screw 96 extends into a cavity 98 formed in the shuttle 76, and the cavity 98 has a plurality of nut docks 98*i* to permit configuring the carriage 74 as appropriate for different sized bays. A nut 100 is disposed in one of the nut docks 98*i* of the cavity 98 of the shuttle 76 and is threadably engaged with the lead screw 96.

It may now be appreciated that with the combination of structure disclosed above, the motor 92 can be activated to move the carriage 74 within the bay 20. More particularly, the motor 92 can be activated to cause the lead screw 96 to rotate, and as the lead screw 96 rotates, the nut 100 rides on the lead screw 96 and thus moves translationally within the bay 20. Consequently, the shuttle 76 and, hence, clips 82, 84 also move translationally within the bay 20. As the skilled artisan will appreciate, by appropriately establishing the direction of rotation of the motor 92, the direction of translational motion of the carriage 74 within the bay 20 can be established.

FIGS. 1 and 3A show that two twin ramps 106 (FIGS. 1 and 3A), 108 (FIG. 3A only) are formed on the bottom plate 54 of the bay 20, and the ramps 106, 108 are configured identical to each other. Taking as an example the ramp 106 shown in FIG. 1, the ramp 106 is formed with a first ramp surface 106*a* that extends upwardly from the bottom plate 54 toward the rear of the bay 20 to a home camming surface 106*b*, with the home camming surface 106*b* being parallel to the bottom plate 54 of the bay 20. Also, the ramp 106 includes a second ramp surface 106*c* that extends upwardly from home camming surface 106*b* to an engaged camming surface 106*d*, with the engaged camming surface 106*d* being parallel to the bottom plate 54 of the bay 20.

FIGS. 1 and 3A show that the present invention incorporates four limit switches or optical detectors. More particularly, FIGS. 1 and 3A show that a lever-type insert limit switch 110 is attached to the bottom plate 54, for instance by heat-staking. If desired, one or all of the limit switches, including the limit switch 110, can be replaced by respective optical detectors (only one optical detector "OD" shown in FIG. 3A for clarity). As more fully disclosed below, the sleeve 12 operates the insert limit switch 110. In response, the limit switch 110 generates an electrical signal.

Additionally, FIG. 3A shows that a cherry-style engaged limit switch 111 is heat-staked to the bay 20, for operation to be disclosed shortly. Moreover, FIGS. 1 and 3A show that a lever-type release limit switch 114 is attached to the bottom plate 54, for instance by heat-staking. As more fully disclosed below, the carriage 74 operates the release limit switch 114. Still further, FIGS. 1 and 3A show that a lever-type home limit switch 118 is attached to the bottom plate 54, for instance by heat-staking, generally opposite the release limit switch 114. As more fully disclosed below, the carriage 74 operates the home limit switch 118.

In the operation of the present invention, cross-reference is made to FIGS. 1 and 3A–3C. FIG. 3A shows the carriage 74 in a home position, wherein the engagement abutments 82b, 84b of the clips 82, 84 are positioned above the home ramp surface 106b, 108b, respectively, of the ramps 106, 108. When the carriage 74 is in the home position, and it is desired to engage the disk drive 25 with the computer 14, the sleeve 12 (shown in phantom in FIGS. 3A–3C) with disk drive 25 is advanced through the opening 22 of the bay 20 until the sleeve 12 abuts the engagement abutments 82b, 84b of the clips 82, 84. Further slight urging of the sleeve 12 causes the sleeve 12 to ride up the respective front inclines 82c, 84c of the engagement abutments 82b, 84b until the engagement abutments 82b, 84b of the clips 82, 84 begin to engage the latch depressions 34, 36 (FIG. 2) of the sleeve 12.

When the sleeve 12 is in the home position shown in FIG. 3A, the sleeve 12 abuts the insert limit switch 110 to cause the insert limit switch 110 to generate an electrical signal. In response to the signal from the insert limit switch 110, the motor 92 is activated to rotate the lead screw 92 such that the carriage 74 with sleeve 12 moves rearwardly in the bay 20, i.e., toward the motor 92, to an engaged position shown in FIG. 3B.

As the carriage moves rearwardly, the clips 82, 84 ride up the second ramp surfaces 106c, 108c of the ramps 106, 108 and onto the engaged camming surfaces 106d, 108d. The skilled artisan will recognize that as the clips ride up the second ramp surfaces 106c, 108c, the engagement abutments 82b, 84b of the clips 82, 84 fully engage the latch depressions 34, 36 (FIG. 2) of the sleeve 12.

Figure 3B:
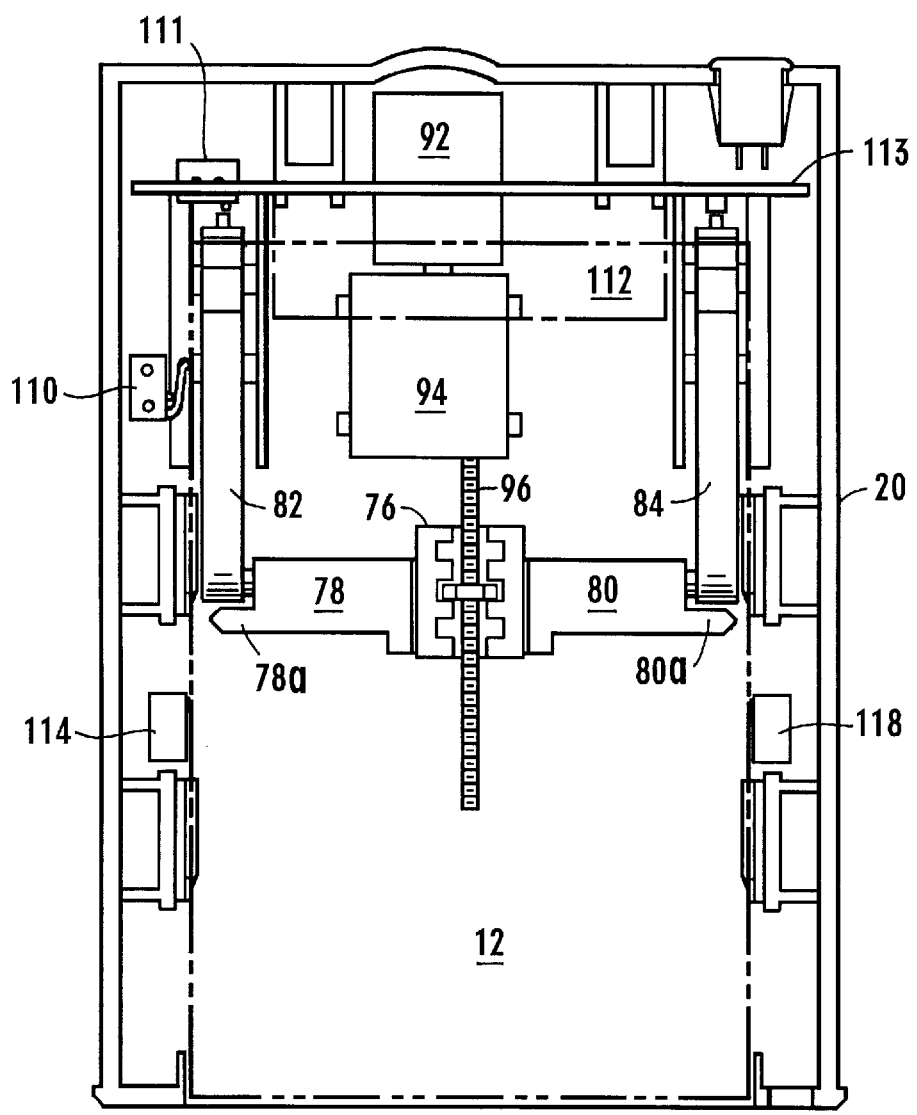
FIG. 3B is a top plan view of the computer bay, showing the disk drive sleeve in phantom in the engaged position.

When the carriage 74 with sleeve 12 reaches the engaged position shown in FIG. 3B, the left clip 82 abuts the engaged limit switch 111, causing the switch 111 to generate and electrical signal. As more fully disclosed below, the signal from the engaged limit switch 111 causes the motor 92 to stop, and power is applied to the hard drive 25. The sleeve 12 with disk drive 25 remains in the engaged position shown in FIG. 3B, with the memory media of the disk drive 25 in electrical communication with the computer 14.

As intended by the present invention, when the carriage 74 with sleeve 12 is in the engaged position, the bay interface connector 42 of the sleeve 12 is operatively engaged with an electrical bay connector 112 that is mounted on a daughter board 113 of the bay 20. As further intended by the present invention, the daughter board 113 is in turn electrically connected to a back plane board 115 (FIG. 1) which holds the electrical components discussed more fully below.

Also, the electrical bay connector 112 (FIGS. 3A–3C) is connected to an external interface connector 112A (FIG. 1) which is also mounted on the daughter board 113 on the side of the daughter board 113 which is opposite the bay connector 112. In turn, the external interface connector 112A is connected via a ribbon connector cable (not shown) to the main data bus, e.g., the SCSI or IDE bus, as appropriate, of the computer 14.

When it is desired to remove the sleeve 12 with disk drive 25 from the bay 20, the operator of the present invention depresses a pushbutton 116 which is mounted on the front of the bay 20 (FIG. 1). The pushbutton 116 is associated with a Panasonic momentary contact switch for generating an eject signal when the pushbutton 116 is depressed. An indicator LED 117 is mounted on the bay 20 adjacent the pushbutton 116 for purposes to be disclosed shortly.

When the pushbutton 116 is depressed, it generates an eject signal. Then, in one embodiment after the elapse of a predetermined time period to permit the disk drive 25 to spin down, the motor 92 rotates the lead screw 96 to move the carriage 74 with sleeve 12 toward the remove position shown in FIG. 3C. In another embodiment, no predetermined time period need elapse before the motor 92 is activated.

Figure 3C:
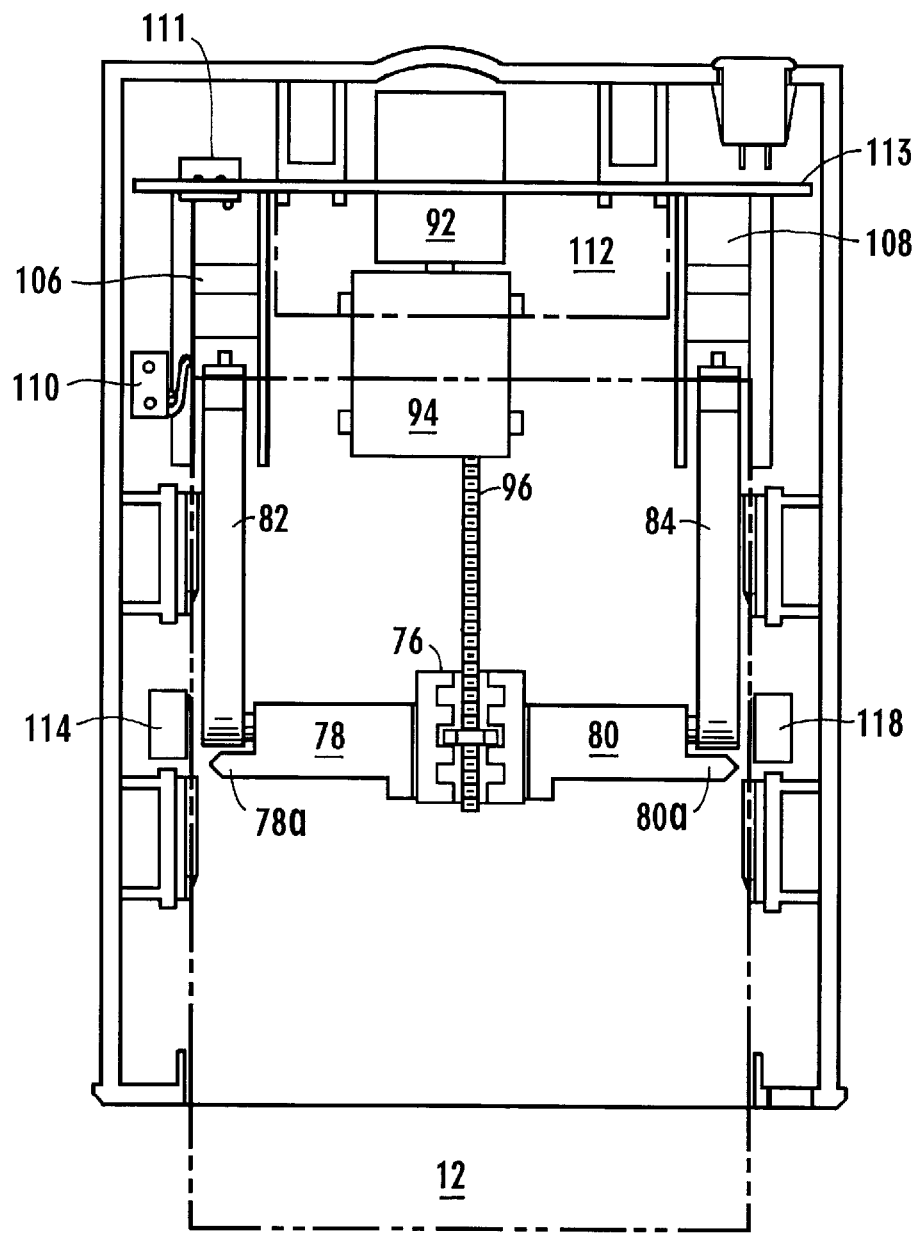
FIG. 3C is a top plan view of the computer bay, showing the disk drive sleeve in phantom in the remove position.

As the carriage 74 moves toward the remove position shown in FIG. 3C, the clips 82, 84 ride down the ramps 106, 108, until the engagement abutments 82b, 84b are respectively positioned over the first ramp surface 106a, 108a of the respective ramp 106, 108. In the remove position shown in FIG. 3C, two operations occur. The first is that the engagement abutments 82b, 84b are distanced from the latch depressions 34, 36 (FIG. 2) of the sleeve 12, thereby causing the sleeve 12 to be released from the carriage 74.

The second operation that occurs when the carriage 74 is in the remove position shown in FIG. 3C is that the extensions 78a, 80a of the respective left and right arms 78, 80 respectively contact, i.e., make, the remove limit switch 114 and home limit switch 118. When these switches 114, 118 are made, they generate electrical signals in response. The presence of electrical signals from both of the switches 114, 118 causes the motor 92 to reverse direction, thereby moving the carriage 74 back toward the home position shown in FIG. 3A. The sleeve 12 with hard disk drive 25 can then be manually removed from the bay 20.

As the carriage 74 starts to move back to the home position shown in FIG. 3A, the extension 78a of the left arm 78 releases the remove limit switch 114. Consequently, the remove limit switch 114 stops generating a signal. Owing to the marginally greater length of the extension 80a of the right arm 80 vis-a-vis the opposite extension 78a, however, the home limit switch 118 remains made, and, in accordance with the present invention, the motor 92 remains activated in the reverse direction when only the home limit switch 118 is made.

When the carriage 74 reaches the home position shown in FIG. 3A, the extension 80a of the right arm 80 releases the home limit switch 118. The absence of a signal from both the remove limit switch 114 and home limit switch 118, causes the motor 92 to deactivate.

Figure 4:
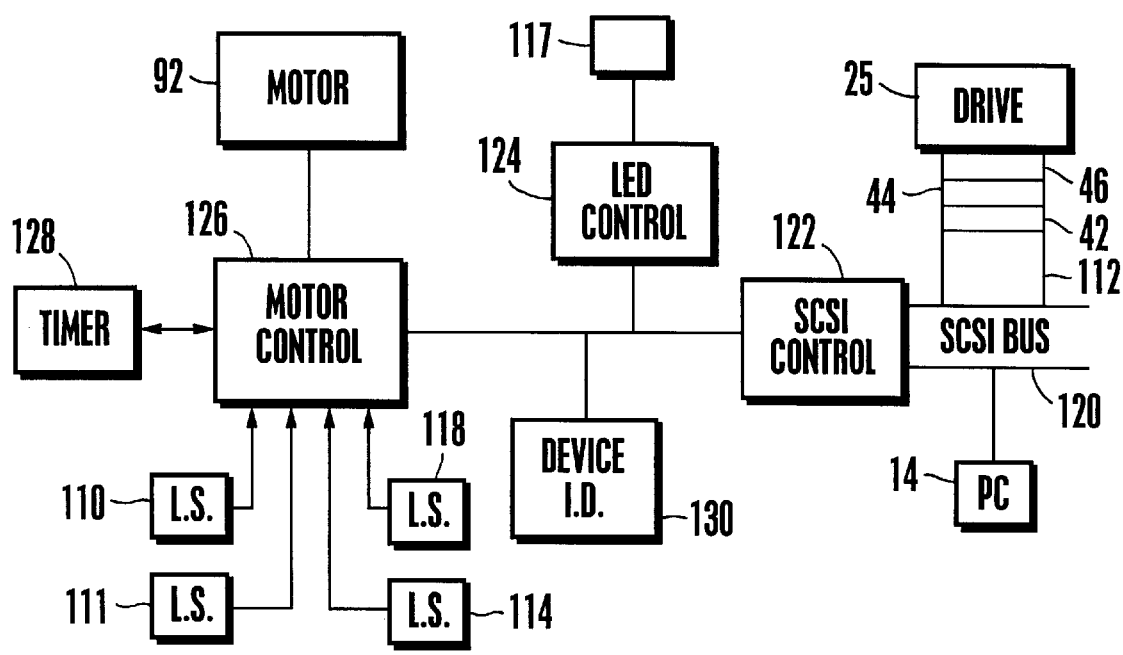
FIG. 4 is a diagram of the electrical components of the present invention.

FIG. 4 shows the electrical components of the present invention, which, the presently preferred embodiment, can be physically located on the back plane board 115 (FIG. 1), or some other convenient location within the bay 20. As shown in FIG. 4, the electrical bay connector 112 (located on the daughter board 113, FIG. 1) is connected to a main data bus 120 of the computer 14. It is to be understood that while the data bus 120 can be any suitable bus, e.g., an IDE bus, in the embodiment shown in FIG. 4 it is a SCSI bus.

In turn, access to the data bus 120 is controlled by a data bus controller 122, physically located on the back plane board 115 (FIG. 1). The data bus controller 122 is any suitable bus control device having the appropriate terminal resistors and routing leads. The data bus controller 122 is also connected to a suitable standard LED controller 124, and the LED controller 124 in turn controls activation of the LED 117 by means well-known in the art.

A motor controller 126 is connected to the data bus controller 122 for controlling activation of the motor 92. In the presently preferred embodiment, the motor controller 126 is a system made of various logic devices of the 74LS series which are coupled to output amplifying transistors by means well-known in the art. As shown in FIG. 4, the motor controller 126 receives the signals generated by the limit switches 110, 111, 114, 118 for selectively activating the motor 92.

FIG. 4 also shows that, if desired, the motor controller 126 can access a timer 128. The timer 128 can be any suitable computer timer. Further, a device identification switch 130 (FIGS. 1 and 4) can be provided for establishing a physical identification number for the device associated with the bay 20. For example, the switch can be a well-known manually set octel switch.

Figure 5:
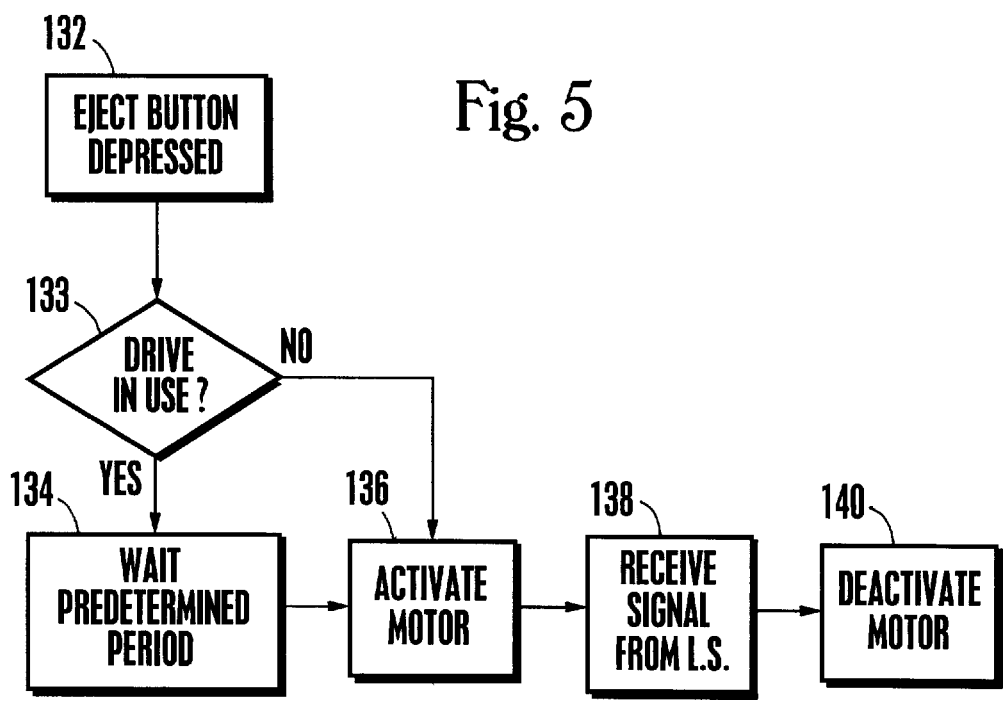
FIG. 5 is a flow chart of the logic of the present invention in ejecting the hard disk from the bay.

FIG. 5 shows the logical steps of the present invention in ejecting the hard drive 25 from the bay 20. As shown at block 132, the pushbutton 116 is initially depressed to generate an eject signal. The motor controller 126 receives the signal from the pushbutton 116 and, at decision block 133, determines whether the hard drive 25 is currently being accessed. If so, the motor controller 126 deactivates the hard drive 25 and, in one embodiment, waits a predetermined time period at block 134 after receipt of the signal. In another embodiment, the procedure at block 134 is not executed.

Then, the controller 126 activates the motor 92 at block 136. Otherwise, the motor controller 126 immediately activates the motor 92 at block 136 to eject the hard drive 25 from the bay 20. It is to be understood that the motor controller 126 can access the timer 128 at block 134. Thus, block 134 functions as a software timer.

The skilled artisan will appreciate that by waiting a predetermined time period before ejecting the drive 25 when the drive 25 is in use, the motor controller 126 ensures that the hard drive 25 has properly "spun down" before ejection. Thereby, damage to the hard drive 25, which could otherwise occur if the sleeve 12 with drive 25 were ejected while the hard drive 25 was still rotating, is avoided.

Thus, at block 136, the motor controller 126 activates the motor 92 to move the sleeve 12 with hard drive 25 toward the home position. When the sleeve 12 reaches the home position shown in FIG. 3A, the flag 102 abuts the home limit switch 118 to cause the limit switch to generate an electrical signal, and at block 138 the motor controller 126 receives the signal. In response, the motor controller 126 moves to block 140 and deactivates the motor 92. The sleeve 12 with hard drive 25 can then be manually removed from the bay 20.

During the steps described above, the LED controller 124 controls activation of the LED 117 (FIG. 1) as follows. When the bay 20 is empty, the LED 117 is constantly green. When the sleeve 12 with hard drive 25 is disposed in the bay 20 and operably engaged with the computer 14, the LED 117 is constantly amber. When the eject button 116 has been depressed, during the wait period of block 134 of FIG. 5 described above, the LED 117 alternately flashes amber, then green. When the hard drive 25 has experienced an error, the LED 117 is constantly red.

Figure 6:
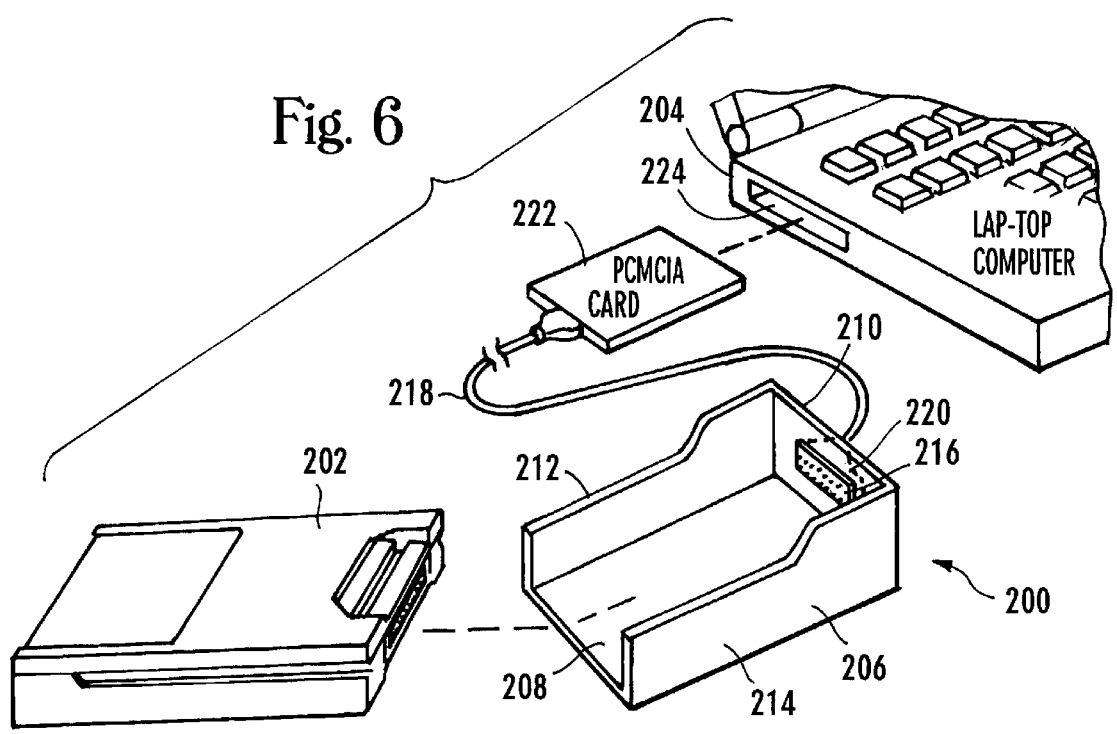
FIG. 6 is a perspective view of an embodiment including a portable shoe for receiving a hard disk drive therein, for connecting the hard disk drive to a laptop computer, showing the various components in an exploded relationship with each other, with portions of the connector cable broken away.

Now referring to FIG. 6, an adaptor system is shown, generally designated 200, for adpating a sleeve/hard drive combination 202 for use with a laptop computer 204. As shown, the system 200 includes an integrally molded lightweight plastic shoe 206 having an open front end 208, a closed back wall 210, and opposed sides 212, 214 extending therebetween. A shoe connector board 216 is attached to the back wall 210 by means well-known in the art, it being understood that the shoe connector board 216 is configured for mating with the pins of the sleeve/hard drive combination 202.

A round (for durability) cord 218 is electrically connected to the connector board 216 via a cord connector 220 (shown in phantom in FIG. 6) that mates with the shoe connector board 216. Also, the round cord 218 is attached to a PCMCIA card 222, preferably made by Greystone Technologies of California. In turn, the PCMCIA card 222 can be inserted into a PCMCIA receptacle 224 in the laptop computer 204.

Per the present invention, the sleeve/hard drive combination 202 is slidably and snugly received in the shoe 206. The combination 202 can be advanced into the shoe 206 until the combination 202 mates with the shoe connector board 216, to thereby effect data communication between the hard drive combination 202 and the laptop computer 204. If necessary, appropriate power pins on the shoe connector board 216 can be jumpered to complement the power pin layout of the connector 220.

Figure 7:
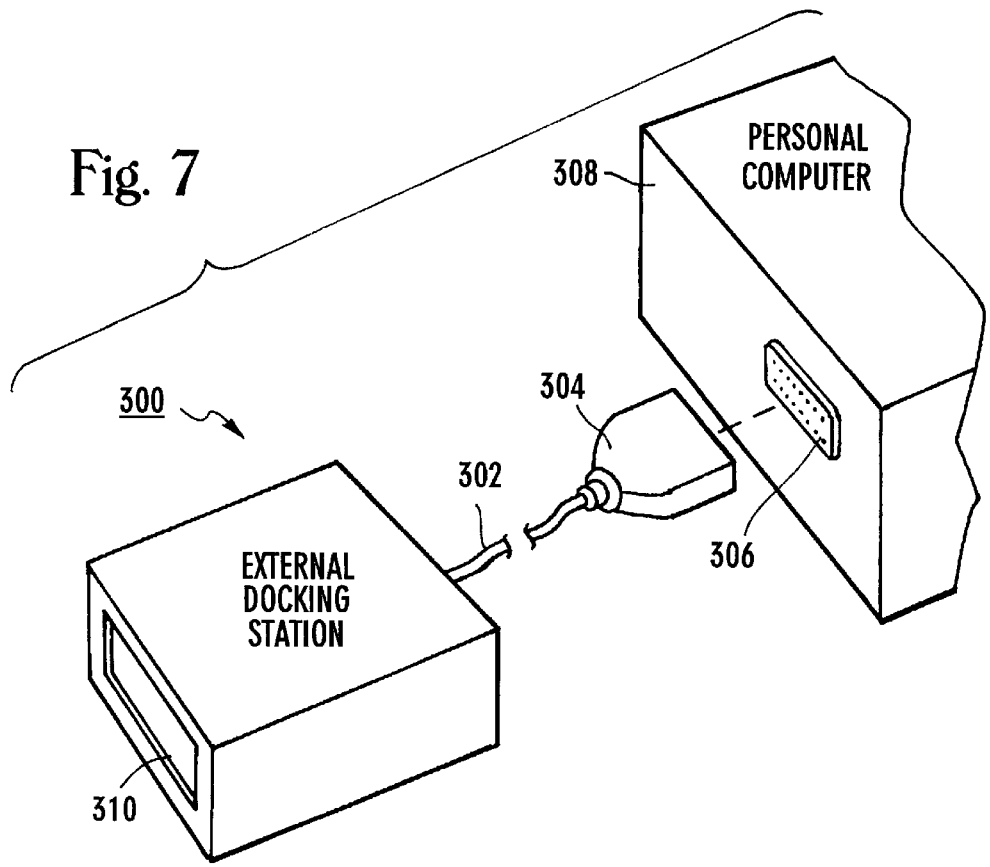
FIG. 7 is a perspective view showing an external version of the docking station of the present invention that is connectable to the parallel port of a personal computer, showing the parallel port connector in an exploded relationship with the parallel port of a PC and a hard drive with sleeve advanced into the docking station, with portions of the connector cable broken away.

Now referring to FIG. 7, a small, portable, external docking station, generally designated 300, is in all essential respects identical to the bay 20 shown in FIG. 1, with the following exceptions. The external docking station 300 does not fit inside of a PC; rather, it is connected via a cable 302 and parallel port connector 304 to a parallel printer port 306 of a PC 308. Accordingly, a sleeve/hard drive combination 310 can be advanced into the external docking station 300, and the connector 304 plugged into the parallel port 306, to effect data transfer between the PC 308 and the hard drive combination 310. Thereby, a user can remove the hard drive combination 310 from, e.g., the internal bay 20 of the PC shown in FIG. 1, transport the hard drive combination 310 with small external docking station 300 to the locale of the PC 308 shown in FIG. 7, and immediately effect data transfer between the PC 308 and the hard drive combination 310, without requiring installation tools and without installing an internal bay such as the bay 20 shown in FIG. 1. It is to be understood that the backplane electrical components of the bay 20 shown in FIG. 1, including the board 113, are replaced by a suitable parallel port board, such as the board made by Shuttle Technologies of Fremont, Calif. and marketed under the name "Parallel Port Solution". It is to be further understood that the software driver that accompanies the parallel port board is loaded into the PC 308.

Figure 8:
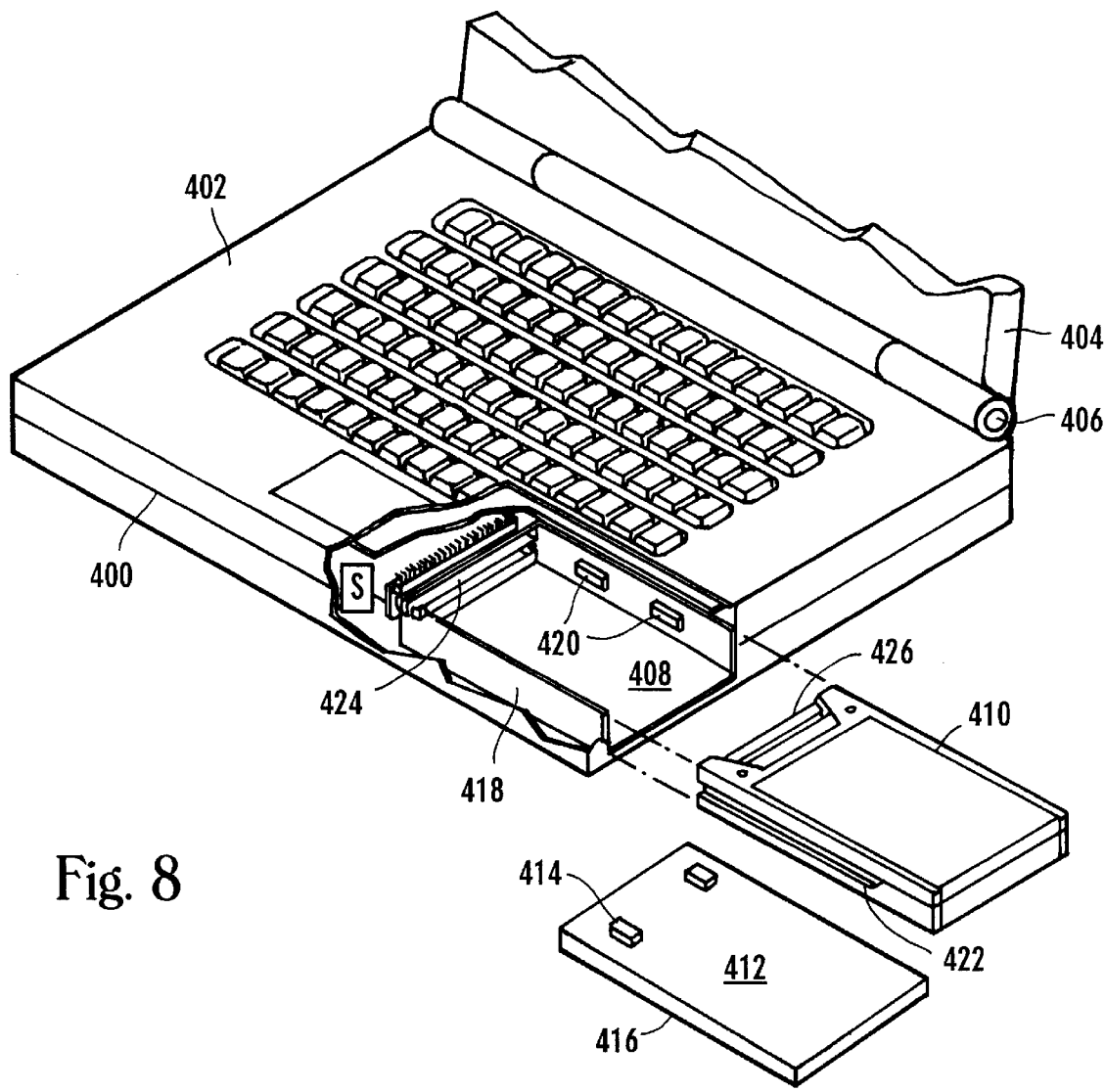
FIG. 8 is a perspective view of a laptop computer in an exploded relationship with a hard disk drive sleeve, with portions of the laptop computer broken away for clarity.

Now referring to FIG. 8, a laptop computer 400 includes a data entry panel 402 connected to a display panel 404 at a hinge joint 406. The data entry panel 402 is formed with an opening 408 into which a sleeve 410 that holds a computer hard disk drive can be advanced. The sleeve 410 can be substantially identical to the sleeve 12 shown in FIG. 1 or the sleeve 500 shown in FIGS. 9 and 10 below, or it can be thinner than, but configured substantially identically to, the other sleeves for fitting into a relatively thin opening 408.

When the sleeve 410 is relatively thin for engaging the laptop computer 400, and it is desired to remove the sleeve 410 from the laptop computer 400 and engage the sleeve 410 with, e.g., the wider opening of the personal computer chassis 52 (FIG. 1), an insert 412 is provided. As can be appreciated in reference to FIG. 8, the insert 412 can be snapped onto the bottom of the sleeve 410 for configuring the sleeve 410 with insert 412 for engaging the wider opening of a personal computer. In one preferred embodiment, the insert 412 includes plural feet 414 that are configured for engaging latch depressions (not shown in FIG. 8) on the bottom of the sleeve 410, it being understood that the latch depressions of the sleeve 410 can be substantially identical to the latch depressions 34, 36 shown in FIG. 2. Furthermore, a bottom surface 416 of the insert 412 can be formed with structure similar or identical to the latch depressions of the present invention for engaging latch arms in a personal computer docking bay or chassis as described above in reference to FIGS. 1–3.

As shown in FIG. 8, a docking bay 418 is configured for fitting inside the opening 408 of the laptop computer 400. In one preferred embodiment, the docking bay 418 may include guide rails 420 that are substantially identical to the key surfaces 66 shown in FIG. 1, for engaging opposed side guide channels 422 in the sleeve 410 (only the left guide channel shown in FIG. 8). In accordance with the principles disclosed above, a bay connector 424 in the docking bay 418 engages a sleeve connector 426 on the sleeve 410 to establish data communication between a hard disk drive in the sleeve 410 and the processor of the laptop computer 400. If desired, a solenoid "S" can be provided to prevent removing the sleeve 410 with hard disk drive from the laptop computer 400 until a predetermined time period has elapsed to allow the disk drive to spin down, in accordance with principles set forth above.

Figure 10:
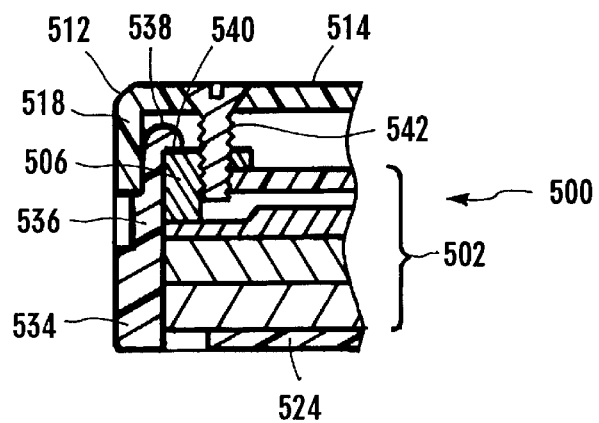
FIG. 10 is a cross-sectional view as would be seen along the line 10—10 in FIG. 9 with the sleeve assembled, with portions broken away.
Figure 9:
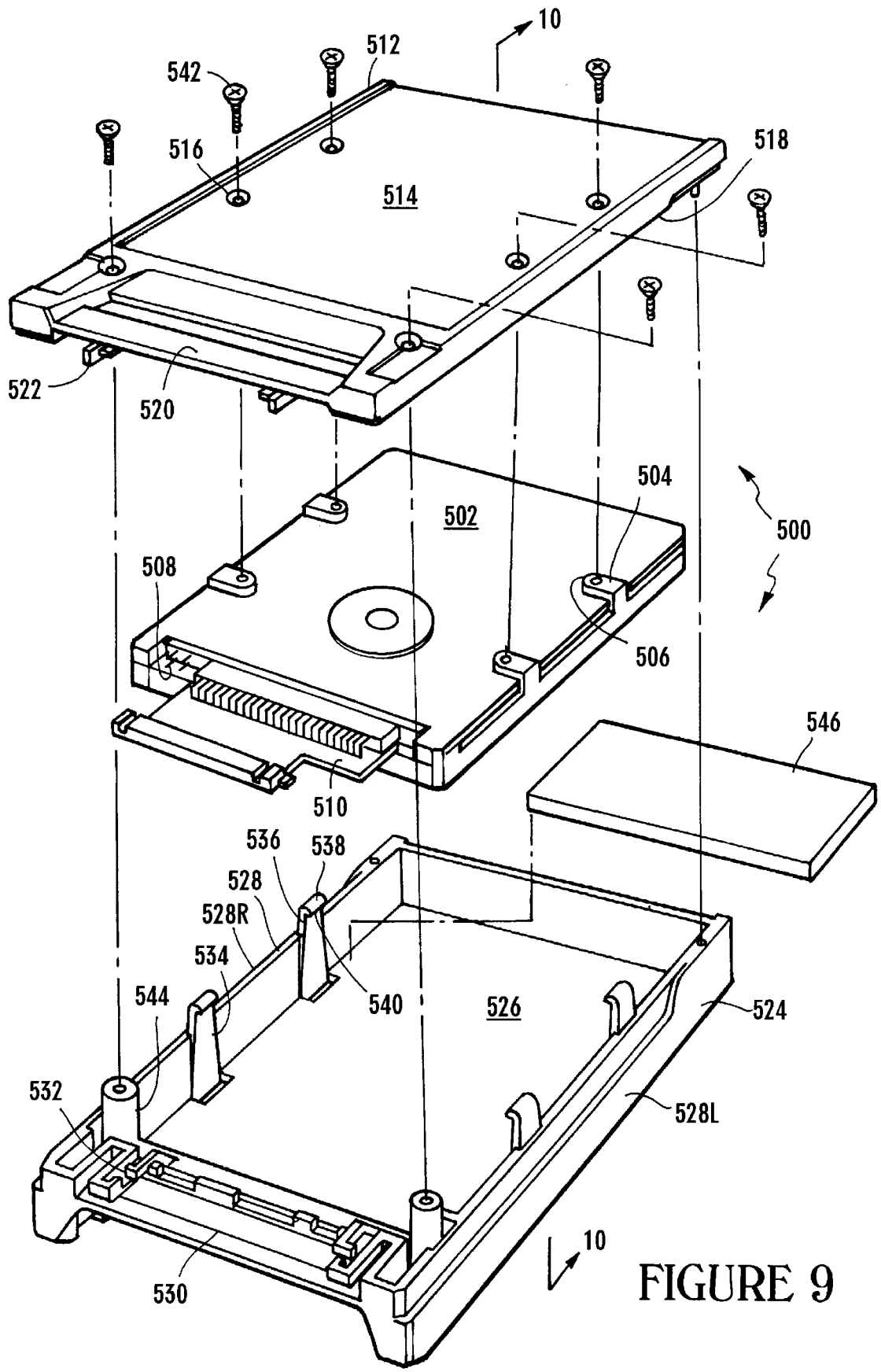
FIG. 9 is an exploded perspective view of the hard disk drive adaptor sleeve.

Now referring to FIGS. 9 and 10, a preferred hard disk drive sleeve is shown, generally designated 500, for holding a conventional hard disk drive, such as a 2.5" hard disk drive 502. In understanding the cooperation of structure that characterizes the sleeve 500, certain features of the conventional hard disk drive 502 are disclosed herein. As shown best in FIG. 9, the hard disk drive 502 includes receptacle stanchions 504 that are formed with respective threaded receptacles 506. Also, the hard disk drives 502 includes connector pins 508, and a sleeve connector 510 is engaged with the pins 508 for in turn engaging a connector in a docking bay of a personal computer or laptop computer as disclosed previously.

With the above disclosure in mind, the sleeve 500 includes a hollow molded plastic generally parallelepiped-shaped top cover 512 that defines a flat planar top surface 514 having preferably six countersunk holes 516 formed therein. An edge flange 518 bounds at least long side edges 520 of the planar surface 514, and as shown in FIGS. 9 and 10 the edge flange 518 is oriented perpendicularly to the planar surface 514.

Additionally, the cover 512 is formed with a top connector support 520 along a front edge of the cover 512. Moreover, the cover 512 is formed with mating rails 522 extending from the top connector support rearwardly, for purposes to be shortly disclosed.

FIGS. 9 and 10 show a generally parallelepiped-shaped, hollow molded plastic bottom base 524 that defines flat planar base surface 526. The base 524 includes a three-sided enclosure wall 528, with the fourth (front) side of the base 524 defining a bottom connector support 530. Opposed engagement channels 532, each of which defines a tortuous path and each of which is configured complementarily to a respective one of the mating rails 522, are formed on the bottom support 530. As the skilled artisan will appreciate, the mating rails 522 mate with respective engagement channels 532, with the sleeve connector 510 sandwiched between the connector supports 520, 530 of the cover and base 512, 524.

As shown in FIG. 9, plural, preferably four, holder arms 534 are formed on the base 524 perpendicularly to the base surface 526. More specifically, two holder arms 534 are formed on a left segment 528L of the enclosure wall 528, and two holder arms 534 are formed opposite the arms 534 that are on the left segment 528L, i.e., two arms 534 are formed on a right segment 528R of the wall 528.

Each holder arm 534 defines a respective top shank 536 that is perpendicular to the flat planar base surface 526 of the base 524 and that extends above the wall 528. As shown best in FIG. 10, each shank 536 terminates in a respective curved top portion 538, and each holder arm 534 further includes a respective flat abutment 540 that is contiguous to the curved top portion 538 and the shank 536. Each abutment surface 540 is perpendicular to its respective shank 536.

In accordance with the present invention, the holder arms 534 are materially biased to a hold configuration shown in FIG. 10, wherein the holder arms 534 overlap the top surface of the hard disk drive 502 when the hard disk drive 502 is positioned in the bottom base 524 to hold the hard disk drive 502 in the bottom base 524. Moreover, the holder arms 534 can be deformed to a receive configuration when the hard disk drive 502 is advanced into the bottom base 524. More particularly, the hard disk drive 502 can be advanced into the base 524 while riding on the curved top portions 538 of the holder arms 534 to move the holder arms 534 toward a receive configuration, wherein the holder arms are pushed outwardly relative to the base 524. Then, the holder arms 534 return to the hold configuration when the hard disk drive 502 clears the curved top portions 538, with the flat abutments 540 flush against the top surfaces of the stanchions 504 of the hard disk drive 502.

Once the hard disk drive 502 is positioned in the base 524, the top cover 512 is positioned over the hard disk drive 502 and base 524, and threaded fasteners 542 are advanced through the countersunk holes 516 in the cover 514 and are engaged with the receptacles 506 of the disk drive 502. Also, as shown best in FIG. 9 two of the fasteners 542 engage respective opposed base receptacles 544 that are formed on the base 524 to thereby hold the cover 512 on the base 524. Owing to the countersunk holes 516, the heads of the fasteners 542 are flush with the top surface 514. Per the present invention, as shown in FIGS. 9 and 10 the holder arms 534 are arranged on the base 524 such that when the hard disk drive 502 is positioned in the base 524, a respective receptacle stanchion 504 of the hard disk drive 502 is juxtaposed with a respective holder arm 534.

It can readily be appreciated in reference to FIG. 10 that in the hold configuration with the top cover 512 attached to the base 524 by the fasteners 542, the edge 518 of the top cover 512 prevents the holder arms 534 from moving to the receive configuration. In other words, as shown in FIG. 10 the holder arms 534 are trapped between the edge 518 and the disk drive 502. Thereby, the disk drive 502 is held securely in the sleeve 500. Stated still differently, the holder arms 534 cooperate with the cover 512 to hold the hard disk drive 502 securely in the base 524 when the hard disk drive 502 is positioned in the base 524.

Accordingly, when the cover 512 is engaged with the base 524, the disk drive 502 cannot inadvertently move in the sleeve 500. Rather, to move the disk drive 502, the cover 512 must be removed from the base 524, and the arms 534 held apart, i.e., manually pulled to the receive configuration. If desired, a foam rubber or plastic spacer layer 546 can be sandwiched between the disk drive 502 and the base 524 to support and cushion the disk drive 502, when the disk drive 502 is relatively thin.

While the particular adaptor sleeve for portable hard disk drive as herein shown and described in detail is fully capable of achieving the above-stated objects, it is to be understood that it is merely exemplary, and that the present invention fully contemplates other particular embodiments, and that the scope of the present invention is to be limited by nothing other than the appended claims.

What is claimed is:

1. A sleeve for holding, in operable engagement with a computer, a hard computer disk drive having a top surface, the sleeve comprising:

a hollow top cover defining a flat planar top surface and an edge flange bounding at least part of the planar surface and oriented perpendicular thereto;

a hollow bottom base removably connectable to the top cover, the base defining a flat planar base surface, the base also including plural holder arms perpendicular to the base surface, the holder arms being biased to a hold configuration, wherein the holder arms overlap the top surface of the hard disk drive when the hard disk drive is positioned in the bottom base to hold the hard disk drive in the bottom base, the holder arms being movable to a receive configuration when the hard disk drive is advanced into the bottom base, wherein the edge of the top cover prevents the holder arms from moving to the receive configuration when the top cover is engaged with the bottom base.

2. The sleeve of claim 1, further comprising an electrical connector positionable on the bottom base for establishing electrical contact with the hard disk drive when the hard disk drive is positioned in the sleeve.

3. The sleeve of claim 2, in combination with the hard disk drive.

4. The sleeve of claim 1, wherein each holder arm is formed with a respective shank perpendicular to the flat planar base surface of the base, each shank terminating in a respective curved top portion, each holder arm also including a respective flat abutment contiguous to the curved top portion and the shank, each abutment surface being perpendicular to its respective shank, whereby the hard disk drive can be advanced into the base while riding on the curved top portions of the holder arms to move the holder arms toward the receive configuration, the holder arms returning to the hold configuration when the hard disk drive clears the curved top portions with the flat abutments flush against the hard disk drive.

5. The sleeve of claim 4, further comprising plural threaded fasteners extending through the top cover and engageable with receptacles on the hard disk drive, the holder arms being arranged on the base such that when the hard disk drive is positioned in the base, a respective receptacle of the hard disk drive is juxtaposed with a respective holder arm.

6. The sleeve of claim 5, further comprising at least one base receptacle on the base for engaging a respective fastener to thereby hold the cover on the base.

7. The combination of claim 3, in further combination with the computer.

8. A sleeve configured for securely holding a computer hard disk drive, comprising:

a hollow top cover defining a flat planar top surface and an edge flange bounding at least part of the planar surface and oriented perpendicular thereto;

a hollow bottom base removably connectable to the top cover, the base defining a flat planar base surface, the base including plural holder arms extending upwardly toward the cover, wherein the holder arms are biased to a hold configuration, wherein the holder arms overlap a top surface of the hard disk drive when the hard disk drive is positioned in the bottom base to hold the hard disk drive in the bottom base, the holder arms being movable to a receive configuration when the hard disk drive is advanced into the bottom base, wherein the edge of the top cover prevents the holder arms from moving to the receive configuration when the top cover is engaged with the bottom base.

9. The sleeve of claim 8, further comprising an electrical connector positionable on the bottom base for establishing electrical contact with the hard disk drive when the hard disk drive is positioned in the sleeve.

10. The sleeve of claim 9, in combination with the hard disk drive.

11. The sleeve of claim 8, wherein each holder arm is formed with a respective shank perpendicular to the flat planar base surface of the base, each shank terminating in a respective curved top portion, each holder arm also including a respective flat abutment contiguous to the curved top portion and the shank, each abutment surface being perpendicular to its respective shank, whereby the hard disk drive can be advanced into the base while riding on the curved top portions of the holder arms to move the holder arms toward the receive configuration, the holder arms returning to the hold configuration when the hard disk drive clears the curved top portions with the flat abutments flush against the hard disk drive.

12. The sleeve of claim 11, further comprising plural threaded fasteners extending through the top cover and engageable with receptacles on the hard disk drive, the holder arms being arranged on the base such that when the hard disk drive is positioned in the base, a respective receptacle of the hard disk drive is juxtaposed with a respective holder arm.

13. The sleeve of claim 12, further comprising at least one base receptacle on the base for engaging a respective fastener to thereby hold the cover on the base.

14. The combination of claim 10, in further combination with the computer.

15. A computing apparatus, comprising:

a laptop computer formed with an opening;

a hard disk drive;

a sleeve holding the hard disk drive and configured for slidably engaging the opening, the sleeve including a cover, a base, and plural holder arms, the holder arms overlapping the hard disk drive and cooperating with at least one of the base and cover to hold the hard disk drive securely in the sleeve; and a sleeve connector connected to the hard disk drive and configured to mate with a corresponding connector in the laptop computer to establish electrical communication between the hard disk drive and the laptop computer, wherein the cover is a hollow top cover defining a flat planar top surface and an edge flange bounding at least part of the planar surface and oriented perpendicular thereto, and the base is a hollow bottom base removably connectable to the top cover, the base defining a flat planar base surface, the holder arms being biased to a hold configuration, wherein the holder arms overlap a top surface of the hard disk drive when the hard disk drive is positioned in the bottom base to hold the hard disk drive in the bottom base, the holder arms being movable to a receive configuration when the hard disk drive is advanced into the bottom base, wherein the edge of the top cover prevents the holder arms from moving to the receive configuration when the top cover is engaged with the bottom base.

16. The computing apparatus of claim 15, wherein each holder arm is formed with a respective shank perpendicular to the flat planar base surface of the base, each shank terminating in a respective curved top portion, each holder arm also including a respective flat abutment contiguous to the curved top portion and the shank, each abutment surface being perpendicular to its respective shank, whereby the hard disk drive can be advanced into the base while riding on the curved top portions of the holder arms to move the holder arms toward the receive configuration, the holder arms returning to the hold configuration when the hard disk drive clears the curved top portions with the flat abutments flush against the hard disk drive.

17. The computing apparatus of claim 16, further comprising:

plural threaded fasteners extending through the top cover and engageable with receptacles on the hard disk drive, the holder arms being arranged on the base such that when the hard disk drive is positioned in the base, a respective receptacle of the hard disk drive is juxtaposed with a respective holder arm; and at least one base receptacle on the base for engaging a respective fastener to thereby hold the cover on the base.

* * * * *